UNITED STATES PATENT OFFICE.

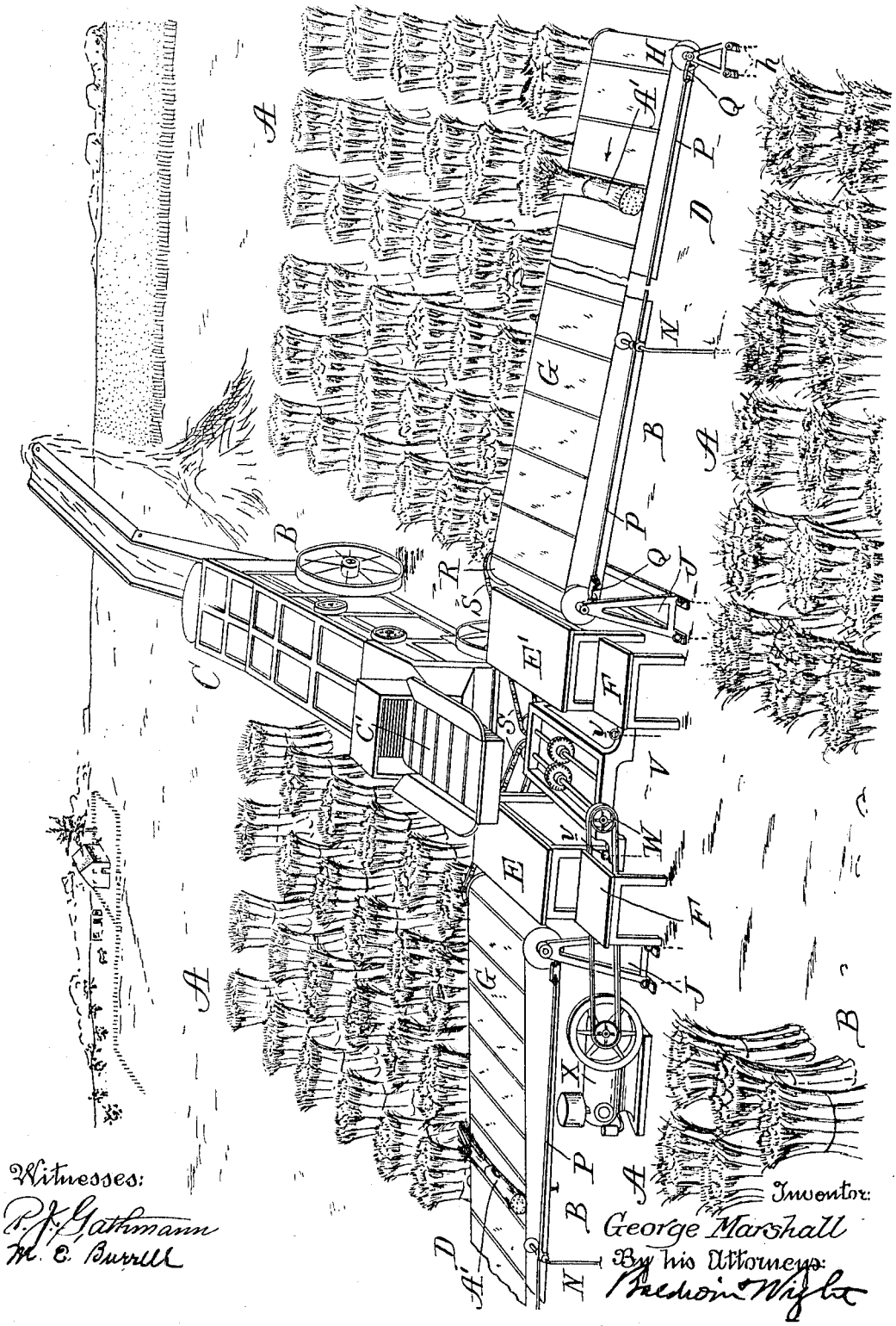

GEORGE MARSHALL, OF FREMONT, NEBRASKA.

BUNDLE CARRIER OR CONVEYER.

1,089,715.   Specification of Letters Patent.   Patented Mar. 10, 1914.

Application filed June 30, 1913. Serial No. 776,653.

*To all whom it may concern:*

Be it known that I, GEORGE MARSHALL, a citizen of the United States, residing in Fremont, in the county of Dodge and State of Nebraska, have invented certain new and useful Improvements in Bundle Carriers or Conveyers, of which the following is a specification.

In practising my invention I convey the shocks to a suitable field and I arrange them in rows with spaces or alleys between them to accommodate a threshing machine or other machines, and according to the present invention I provide means for conveniently and expeditiously conveying the sheaves or bundles of grain from distant points in the alleys to the threshing machine. The shocks are deposited in the field by the shock truck in such manner as to leave alleys between groups of shocks. The alleys radiate from a central space and may each be 50 feet long and each one is of suitable width to accommodate the mechanism employed. I place the threshing machine in one of the alleys and in a transverse alley I arrange conveyers of improved construction which carry the bundles or sheaves of grain to the threshing machine. The conveyers are preferably driven by a gasolene engine but may be operated by other motors, and the conveyer mechanism is such that it may be conveniently taken down and reduced to a small size for transportation.

The accompanying drawing is a perspective view showing how the shocks are arranged in the field with alleys between groups of shocks and how the threshing machine is arranged in one of the alleys and the conveyer mechanism in other alleys.

The shocks A, it will be observed, are of quite large size and may contain as many as twenty or thirty sheaves or bundles of grain. These shocks are deposited by shock-forming means in the field and are then conveyed to another field or to another part of the field and are deposited in such manner as to form groups of shocks with alleys B between them. These alleys may be of any suitable length and width to accommodate the mechanism.

C indicates a threshing machine which may be of any suitable kind. This is arranged in one of the alleys and the conveyers D are arranged in transverse alleys on opposite sides of the feed conveyer C' of the threshing machine.

E, E' indicate platforms on opposite sides of the feed conveyer to which the sheaves or bundles A' are delivered by the conveyers D.

F indicates platforms on which the pitchers or attendants may stand to take the bundles of grain from the platforms E, E' and deliver them to the feed conveyer C'. In the arrangement shown six men or hands may be employed, two on opposite sides of each conveyer D making four, and two on the platforms F.

It will be understood that the shocks are broken up before delivery to the conveyers, the sheaves being separately placed on the conveyers and delivered to the platforms E, E'. Inasmuch as the shocks are of large size and cannot be conveniently carried from distant points to the threshing machine, this conveying mechanism enables me to feed the sheaves to the threshing machine without undue labor. The conveyers D are preferably in the form of belts. The outer end of each belt or conveyer G is supported by a frame H and such frame is anchored to the ground by rods *h*. The upper end of each belt G is supported by a frame J which may be anchored to the ground in any suitable way.

In order to support the upper portion of each belt intermediate of its ends, I may employ suitable frames N as indicated. These frames may be of any suitable kind. In order to hold the frames N in proper vertical position and to prevent them from bending I employ tie-rods P which are connected to the frames N, H and J as shown. The upper or inner end of each belt or conveyer G is supported on a roller of any suitable kind to which is connected a sprocket wheel R connected in turn by a sprocket chain S with gearing of any suitable kind supported in a frame V arranged between the platforms E, E'. This frame V is secured to the ground by means of rods *v*. The gearing within the frame V is provided with a pulley W which is belted to a gasolene engine X arranged in one of the alleys. It is obvious that any other driving motor may be employed. When the mechanism is thus constructed and arranged the pitchers arrange themselves in the manner before stated, that is to say, two of the pitchers stand on the platforms F and two on opposite sides of each of the conveyers. The shocks are broken up into bundles or sheaves and placed on the conveyers which carry the bundles to the platforms E, E', the pitchers on the platforms F deliver the sheaves or bundles to the feed conveyer C' of the threshing machine. After the shocks in four groups have in this way been broken up and supplied to the threshing machine by the conveyers, the mechanism may be moved to another group of shocks and the operation may be resumed.

I claim as my invention:

The combination with a feed conveyer, of platforms arranged on opposite sides thereof to receive the grain, platforms on which attendants stand to take the sheaves from said first mentioned platforms and deliver them to the feed conveyer, conveyers on opposite sides of the feed conveyer and extending from each of said grain-receiving platforms, a frame arranged between said two grain-receiving platforms, gearing carried by said frame and connected with said conveyers, and means for operating said gearing.

In testimony whereof, I have hereunto subscribed my name.

GEORGE MARSHALL.

Witnesses:
S. S. SIDNER,
JESSIE M. GAGE.